United States Patent [19]

Heathcott

[11] 4,169,604

[45] Oct. 2, 1979

[54] ROD SEAL

[76] Inventor: Joe W. Heathcott, 5135 Grape, Houston, Tex. 77096

[21] Appl. No.: 897,581

[22] Filed: Apr. 19, 1978

[51] Int. Cl.² .............................................. F16J 15/18
[52] U.S. Cl. .................................... 277/125; 277/180; 277/205; 277/124
[58] Field of Search ........ 277/102, 103, 112, 123–125, 277/180, 186, 199, 205, 215

[56] References Cited

U.S. PATENT DOCUMENTS

| | | | |
|---|---|---|---|
| 2,006,602 | 7/1935 | Muster | 277/124 |
| 2,509,151 | 5/1950 | Kasten | 277/205 |
| 2,509,436 | 5/1950 | Isenbarger | 277/205 X |
| 2,818,287 | 12/1957 | Josephson | 277/205 |
| 3,282,594 | 11/1966 | Wheeler | 277/125 X |
| 3,664,676 | 5/1972 | Petersen | 277/186 X |
| 3,790,179 | 2/1974 | Scannell | 277/205 X |

FOREIGN PATENT DOCUMENTS

| | | | |
|---|---|---|---|
| 985295 | 3/1951 | France | 277/205 |
| 814830 | 6/1959 | United Kingdom | 277/125 |

*Primary Examiner*—Robert S. Ward, Jr.
*Attorney, Agent, or Firm*—Russell D. Weaver; Murray Robinson; Ned L. Conley

[57] ABSTRACT

A seal between an apertured body and a rod extending through the aperture comprises a box in the body around the aperture in which is disposed a packing assembly including one or more packing rings each sandwiched between a pair of adapter rings, the packing assembly being compressed in the box by a compression ring disposed about the rod and secured to the body. The packing rings are made of fabric reinforced elastomers, homogenous elastomers or similar conventional seal materials. The adapter rings are made of hard metal or plastics material. The packing rings have one or more portions of reduced axial thickness which receive mating projections of the adapter rings. Prior to compression, there is space between the adapter rings and packing rings adjacent the thicker portions of the packing rings, into which space the packing ring material can flow when compressed. The adapter ring projections are shaped (tapered) so as to compress the packing rings mostly axially and to press the packing rings radially outwardly only slightly. Movement of the compression plate sufficient to press the seal lips against the rod and box in fluid tight relationship will require such axial compression of the thin section that it will be highly stressed and react strongly to resist further compression of the seal.

21 Claims, 7 Drawing Figures

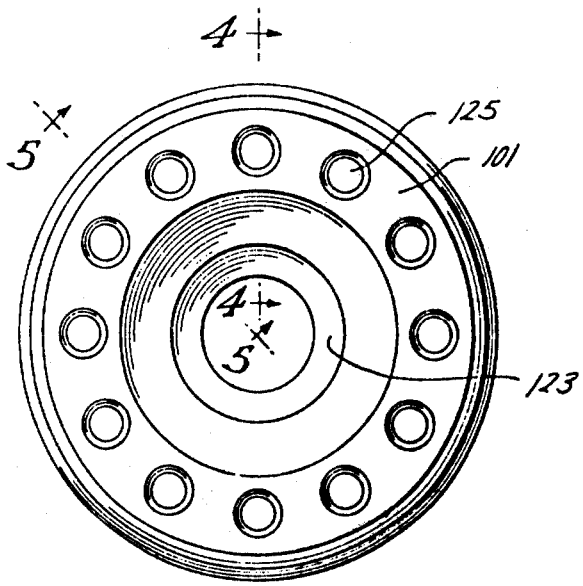
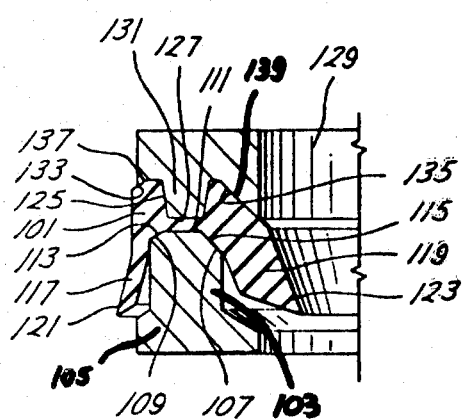
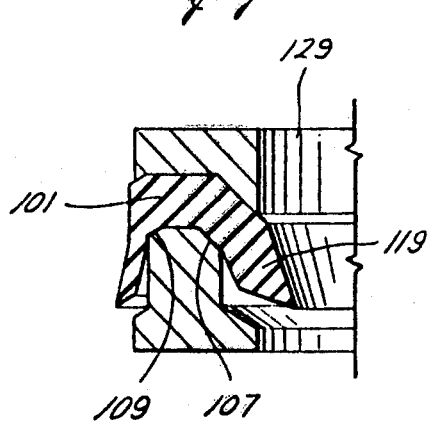
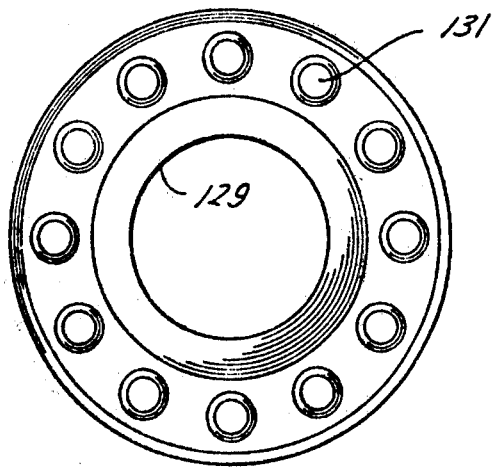

ROD SEAL

BACKGROUND OF THE INVENTION:

a. Field of Invention

This invention relates to gland type means for sealing between an apertured body and a moving or movable rod passing therethrough, e.g. a piston rod extending through an aperture in the end of a pump or an engine cylinder. Typically the aperture and rod have cylindrical surfaces.

b. Discussion of the Prior Art

Conventional gland type rod seals are subject to overtightening of the seal causing premature failure. This may be due to increased frictional engagement of the packing rings with the rod moving therethrough. Furthermore, conventional gland type rod seals are subject to incorrect adjustment or allow for no initial compression of sealing lips for sealing at low pressures or on worn surfaces. It is an object of the invention to overcome these problems.

SUMMARY OF THE INVENTION:

The present invention provides a seal between an apertured body and a rod extending through the aperture in which controlled compression of the packing of the seal reduces chances of premature packing failure by eliminating overtightening of the packing during installation. Sufficient compression of the packing is allowed, however, thereby seal lips of the packing will be activated at low fluid pressures.

According to the invention a seal of the above type comprises lip type packing rings made of fabric reinforced elastomer, homogenous elastomer, or other conventional packing material. The rings are provided in their medial portions between their inner and outer peripheral lips with circumferentially disposed thin portions. Each packing ring is disposed between a pair of hard adapter rings made of metal or plastics or other strong material having protuberant portions adapted to engage the thin portions of the packing rings. Space is left between the adapter rings and packing rings and the adjacent rod and box into which space the packing ring material can flow. The packing assembly provided by the rings is loaded by means of a compression ring around the rod over the box. The protuberant portions of the adapter rings are tapered or otherwise shaped so that loading causes mostly axial compression of the thin section and only a small amount of radial expansion and contractions of the packing rings. Initial axial loading of the packing assembly squeezes the thin sections of the packing rings and causes radial flow of the material of the packing rings inwardly toward the rod and outwardly toward the box, activating the lip seals. Further loading tends to make the assembly go solid preventing overtightening, i.e. the thin portions will be so thinned out that even small absolute movements of the compression plate will represent a high percentage of the thickness remaining of the thin sections, requiring a large force to cause the movement. In this latter regard, recall that stress is proportional to the change in thickness divided by the total thickness, so that if the total thickness is smaller, the increase in strain for any given amount of movement will be greater. For that reason after the thin section becomes even thinner, under the initial compression, further compression requires a very large force not likely to be exerted, so that packing ring lips are not overly compressed against the rod.

Although it is only necessary to have a single packing ring, a plurality may be employed. The packing ring lips are directed to seal against the higher pressure on one side of the seal. If there is little pressure differential, the seal will function to prevent fluid flow in either direction, even though the lips may all be directed to seal against high pressure on one side of the seal. Although an adapter ring is desirable both above and below each packing ring, if there are plural packing rings a single adapter ring may serve for both a packing ring thereabove and one therebelow. Although it is preferred to provide concavities on both sides of each packing ring to form the thin section, other configurations are possible. Considering the mouth of the packing box as the top of the box, the compression ring could be combined with the uppermost adapter ring and the bottom of the packing box could be combined with the lowermost packing ring.

Typically the compression ring will be a nut screwed into the packing box, but it could be any other appropriate structure, e.g. an annular plate bolted to the body, e.g. around the mouth of the box and having an annular boss on its lower side bearing against the top adapter ring. Any suitable means for applying force to the compression ring can be employed.

The rod, body, and compression ring usually will be made of metal, e.g. steel, the packing rings of an elastomer, e.g. natural or synthetic rubber, plain or fabric reinforced, and the adapter rings typically will be made of hard plastics material which can be easily molded, although they may also be made of metal. Hardness ranges typically would be 60 to 95 on the Shore A scale for the packing rings, and 50 Durometer on the Shore D scale to R-120 for the adapter rings, if made of plastics. Suitable plastics materials for the adapter rings are filled phenolics and filled nylons.

The uncompressed thickness of the thin section should be in the range of 0.031 to 0.062 inch varying in accordance with the radial and axial thickness of the packing ring as a whole, the thickness of such thin section being in the range of about 15 to 30 percent of that of the adjacent thick sections.

BRIEF DESCRIPTION OF THE DRAWINGS

For a further description of a preferred embodiment of the invention reference will now be made to the accompanying to scale drawings wherein:

FIG. 3 is a top view of a packing ring for a modified form of packing assembly;

FIGS. 4 and 5 are vertical sections of the modified packing assembly at planes 4—4 and 5—5 of FIG. 3;

FIG. 6 is a bottom view of the adapter ring of the FIG. 4 assembly.

Figure 1:
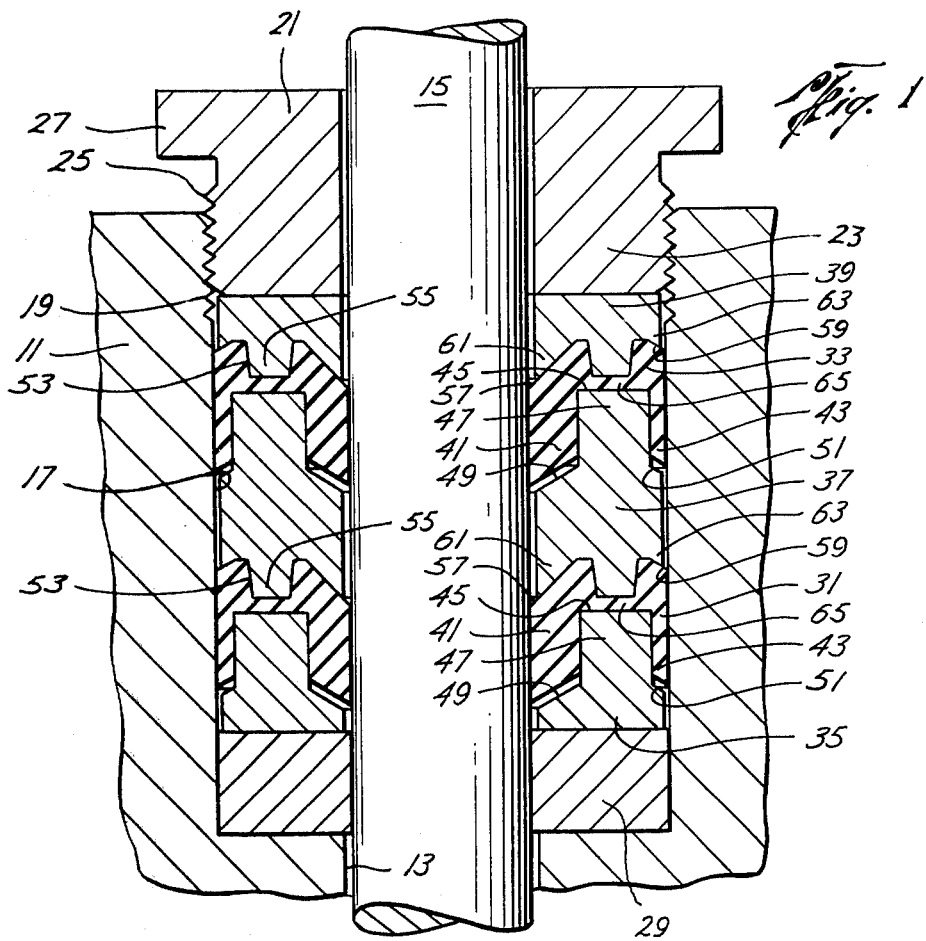
FIG. 1 is an axial section through a rod seal embodying the invention.
Figure 1A:
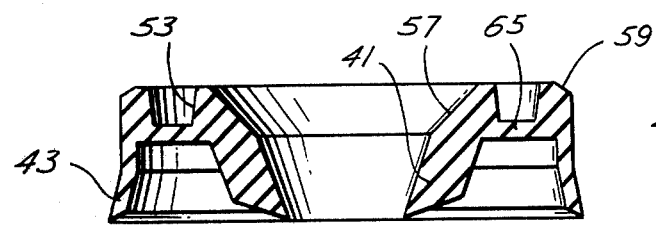
FIG. 1A is a vertical section through one of the packing rings of the FIG. 1 rod seal separate from the seal of the packing assembly.
Figure 2:
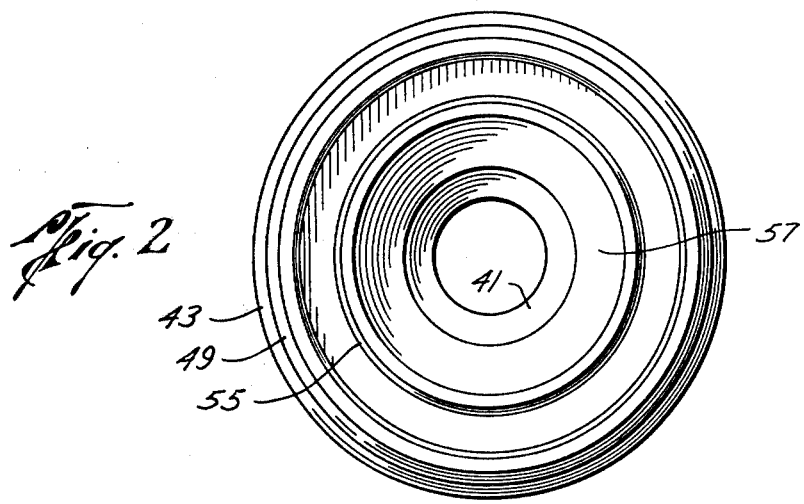
FIG. 2 is top view of one of the packing rings separate from the packing assembly.

DESCRIPTION OF PREFERRED EMBODIMENT OF THE INVENTION:

Referring now to FIGS. 1, 1A and 2, there is shown a body 11 having a cylindrical aperture 13 therethrough. A cylindrical rod 15 extends through the aperture in the body. A cylindrical box 17 is concentrically disposed around the rod at one end of aperture 13. The mouth of the box is provided with an internal constant diameter screw thread 19. A compression ring 21 is disposed over the mouth of the box around rod 15. Ring 21 has a boss 23 on its lower side. Boss 23 has an external constant diameter screw thread 25 correlative to thread 19. Preferably compression ring 21 has a radial flange 27 overlying body 11 to keep dirt out of the threads and to provide greater leverage for a wrench applied thereto. As is well known, flange 27 may be hexagonal or of other non-circular configuration to facilitate turning with a wrench.

Within box 17 is a packing means adapted to prevent fluid flow through aperture 13, especially from the lower end of the aperture to the upper and thereof. The packing means includes at the bottom of the box, i.e. the upstream end of the assembly, a thick lower seal ring or washer 29, made of some fairly hard incompressible material such as steel, brass, or plastics. Washer 29 is of constant thickness, and has cylindrical inner and outer peripheries fitting closely around the rod and within the box. Washer 29 effects a preliminary seal in that the fluid flow path therepast is fairly long and narrow, so that there is considerable pressure drop thereacross.

The packing means further includes a packing assembly between washer 29 and compression ring 21. The packing assembly includes packing rings 31, 33 alternating with adapter rings 35, 37, 39.

When positioned in box 17, the packing rings have inner peripheries that are cylindrical and in contact with rod 15 and have outer peripheral surfaces that are cylindrical and in contact with box 17. The inner and outer peripheries of the adapter rings are also cylindrical but are slightly spaced from the rod and box respectively.

The packing rings have downwardly pointing tapering inner and outer annular lips 41, 43 on their lower faces. Between these lips on each packing ring is an annular, rectangular cross-section groove 45 adapted to receive a correlative annular, rectangular cross-section tongue 47 on the upper face of each of the lower two adapter rings. The tongues are higher than the grooves are deep so that lips 41, 43 do not contact annular shoulders 49, 51 adjacent the tongues.

The upper faces of the packing rings are each provided with Acme cross-section (flat bottom, upwardly flaring) annular grooves 53 adapted to receive a correlative annular, Acme cross-section tongue 55 on the lower face of each of the upper two adapter rings. In cross section, the configuration of a tongue 55 received in a groove 53 resembles that of the cross section of an Acme screw thread, an illustration of which will be found at page 994 of *Machinery's Handbook*, 15th ed. (The Industrial Press, New York 1956). Tongues 55 are of the same height as grooves 53 and the generally flat horizontal upper surfaces of the packing rings adjacent the grooves are in contact with the generally flat lower surfaces of the two upper adapter rings adjacent the tongues. The inner and outer peripheries of the packing rings are beveled at their upper ends at 57, 59 and the bevels are engaged by correlative downwardly pointing, tapered, inner and outer annular, retaining lips 61, 63 on the lower faces of the upper two adapter rings.

From the foregoing description it will be apparent that each packing ring includes a medial web or thin portion 65 which will be compressed between tongues protuberant from the adapter rings above and below the packing ring. In addition, due to the taper of the Acme cross-section tongues above each packing ring, the packing rings will be stretched and contracted radially at their outer and inner portions respectively, when the compression ring is moved farther into the box.

When the compression ring is advanced sufficiently into the box, the thickness of webs 65 is reduced to the point where further compression is difficult. By this time there has been sufficient radial inward and outward movement of packing material to energize inner and outer lips 41, 43 to seal lightly against rod 15 and box 17.

Referring now to FIGS. 3–6, and more particularly to FIG. 4, there is shown a modified form of the packing assembly of the invention in which only a single packing ring 101 is employed and the top of tongue 103 on the lower adapter ring 105 is bevelled on its inner and outer peripheries at 107, 109. Tongue 103 is of greater height than in FIG. 1, having a height about equal to its width in vertical section. Packing ring 101 has a groove 111 whose edges are bevelled at 113, 115 correlative to the top of tongue 103. In the relaxed position of packing ring 101, i.e. when it is not in the seal box, the sides 117, 119 of groove 111 flare downwardly away from tongue 103. This causes these sides to press against the box and rod when initially installed, insuring instant sealing by lips 121, 123.

The principal modification introduced in the FIG. 4 construction is the substitution for grooves 53 of a plurality of conical sockets 125, azimuthally spaced, for example, by 30 degrees, annularly disposed about the top of packing ring 101. This results in a plurality of annularly disposed thin sections 127 spaced 30 degrees apart instead of the single ring shaped thin section 65 in each of the packing rings of FIG. 1. The FIG. 4 construction insures the integrity and strength of the packing rings while maintaining the compression limiting feature.

Adapter ring 129 has a plurality of conically tapered pins 131 on the lower side thereof, mating with sockets 125. Pins 131 take the place of tongues 55 of the FIG. 1 construction and function in a similar manner to effect primarily axial compression of the packing ring upon loading of the compression ring, but achieving sufficient radial flow of the packing ring material to energize lips 121, 123. As in the FIG. 1 embodiment, the top of packing ring 101 is bevelled on its inner and outer peripheries at 133, 135 and upper adapter ring 129 is provided with mating lips 137, 139.

It will be understood that the packing assembly shown in FIG. 4 is to be employed with the box and rod and other elements of the FIG. 1 construction and operated in the same manner.

REFERENCE

As the result of a novelty search on the subject invention, the following references were found, same all being United States patents:

| | |
|---|---|
| 1964237 | Wheeler |
| 1991715 | Wheeler |
| 1992967 | Roy |
| 2706655 | Showalter |
| 3011808 | Tucker et al |
| 3120394 | Gould |
| 3586341 | Whittaker |
| 3790179 | Scannell |
| 3915463 | Pippert |
| 2199735 | Beckman |

| -continued | |
|---|---|
| 3467394 | Bryant |
| 4006881 | Gaillard |
| 3284088 | Pippert |
| 3801112 | Dumazet |

The foregoing patents illustrate various uses for the subject rod seal, such as the oil well plunger shown by Roy, the kelly seal shown by Beckman, the pump piston of Wheeler, and the valve stem seals of Gaillard and Dumazet, as well as the general purpose rod or shaft seals illustrated in all of the patents.

With regard to the first group of the above listed Wheeler (U.S. Pat. No. 1,964,237) shows packing rings of unequal density, Wheeler (U.S. Pat. No. 1,991,715) shows single lip packing rings, Roy shows single lip packing rings with mating tongues and groove, Showalter shows compression type packing rings with mating tongues and grooves, and Tucker shows single lip packing rings with a medial groove but no adapter rings.

Referring to the second group of the above listed patents, the Gould, Whittaker et al., Scannell, and Pippert (U.S. Pat. No. 3,915,463), patents each show a packing assembly including a plurality of grooved rubber double lip packing rings, but without any adapter rings therebetween, though Gould uses a filler strip in the grooves of his split packing and in the Whittaker constructions the shole stack of packing rings is sandwiched between upper and lower adapter rings.

None of the above discussed two groups of patents shows a medial thin portion as contemplated by the present invention nor the combination of a medial thin portion with adapter rings in engagement with both the upper and lower faces thereof.

Referring to the third group of the above listed patents, the Beckman, Bryant, and Gaillard patents show packing assemblies including alternating packing rings and compression rings but the packing rings do not incorporate medial portions that are thin.

In the Bryant construction, the packing rings have no thin portions and the adapter rings initially are out of engagement with the medial portions of the packing rings thereabove.

Beckman shows a packing assembly composed of alternating packing rings and metal adapter rings, the latter having inner edges, not medial portions, of reduced thickness. The portions of reduced thickness provide steps to interlock with annular tongues on the inner peripheries of the adapter rings. Only light sealing with the box is possible since the assembly rotates in the box. No lips are used.

The Gaillard patent shows a packing assembly employing alternating resilient packing rings and metal compression rings. The latter are not stated to be adapter rings in the sense of being provided with surfaces that mate with the packing rings. Although the compression rings have convex surfaces which press into the medial portions of the packing ring when the assembly is loaded, it is said that the packing rings are to be "flattended" by 20% during such loading, thereby to render them radially water-tight.

Gaillard also shows that the loading on a valve seal seat can be limited by placing a hard (graphite) washer between an annular tongue and groove on the body flange, but in this case the sealing means is in two pieces, in fact made of two different materials.

Referring to the fourth group of patents listed above the Dumazet and Pippert U.S. Pat. No. 3,248,088 patents relate to packing assemblies with means to limit compression.

The Dumazet patent shows compression limiting metal rings between inner and outer peripheral soft packing rings, whereby the degree of compression of the latter is limited when the metal rings engage. The inner and outer packing rings are not integral so that double the number of packing rings is required compared to the present invention.

Pippert U.S. Pat. No. 3,284,088 discloses a packing assembly including alternate packing rings and adapter rings. The packing rings each include a thin expended metal base having rubber molded thereto forming inner and outer lips with a very thin covering over the medial portion of the base so that the medial portion is substantially unyielding in compression. The adapter below each packing ring is out of contact with the medial portion of the base until the inner and outer lips are radially expanded. In other words, there is no medial compression of the medial section flowing rubber radially outwardly into the lips before axial travel is arrested. The thin section of this Pippert construction requires metal reinforcement to provide enough strength to keep it integral.

Applicant is also aware of U.S. Pat. No. 3,120,960 to Pippert and Heathcott which discloses a double lip packing ring.

CLAIM TERMINOLOGY

In the following claims, the terms upper and lower will be used to indicate different parts of the packing assembly, having reference to the closed or bottom end of the box as being the lower end and the open end of the box as being the upper end, but it will be understood that the seal can be used in any position, e.g. with the "bottom" or closed end of the box uppermost, so that the terms upper and lower are merely relative, e.g. to the box, and not absolute or limiting with respect to the scope of the invention.

I claim:
1. Rod seal packing assembly comprising
   a packing ring having inner and outer annular peripheral portions including seal means to seal with a rod extending therethrough and a box thereabout respectively, and an annular medial portion between said peripheral portions connecting them together to form a unitary ring, and
   upper and lower ring shaped compression means, respectively above and below said packing ring, including medial portions for engaging said medial portion of the packing ring,
   said medial portions of said packing ring and said compression means including stress control means for creating a reaction force to restrain further compression of the assembly after a certain degree of compression of the assembly has been achieved,
   said medial portion of the packing ring being made of compressible resilient material having a lower modulus of elasticity than said medial portions of the compression means which are made of a material harder than said packing ring and relatively incompressible,
   said stress control means including a thin portion in said medial portion of the packing ring thinner than the portions of the packing ring adjacent thereto and a protuberant portion on said medial portion of an adjacent compression means.

2. Assembly according to claim 1, said seal means comprising innner and outer peripheral lips extending downwardly from said inner and outer peripheral portions of said packing ring, said upper compression means including inner and outer annular peripheral portions backing up said inner and outer peripheral portions of the packing ring respectively.

3. Assembly according to claim 2, said protuberant portion extending downwardly from said medial portion of said upper compression means, said lower compression means having an annular tongue extending upwardly therefrom, said lips in the relaxed state flaring downwardly and outwardly beyond the upper parts of said peripheral portions of said packing ring, said lips lying alongside of said tongue when said packing assembly is placed in a box adapted thereto.

4. Packing assembly according to claim 3, said packing ring having bevels at its upper inner and outer peripheral edges and said upper compression means having inner and outer peripheral lips correlative to said bevels.

5. Packing assembly according to claim 1, said thin portion being formed by an annular groove in said medial portion of said packing ring, said protuberant portion comprising an annular tongue extending into said groove from said medial portion of said adjacent compression means.

6. Packing assembly according to claim 5, said groove and the last said tongue having cross-sections whose sides converge going axially in the direction from said adjacent compression means.

7. Packing assembly according to claim 3, said thin portion being formed by an annular groove in the upper face of said medial portion of said packing ring, said protuberant portion comprising an annular tongue extending downwardly from said medial portion of the upper compression means into said annular groove.

8. Packing assembly according to claim 4, said thin portion being formed by an annular groove in the upper face of said medial portion of said packing ring, said protuberant means comprising an annular tongue extending downwardly rom said medial portion of the upper compression means into said annular groove, said groove and the last said tongue having Acme type cross-sections whose sides flare upwardly, whereby upon loading of said assembly the material of the packing ring is forced from said medial portion thereof radially, inwardly and outwardly, and downwardly into said lips.

9. Packing assembly according to claim 1, said thin portion being formed by a plurality of annularly disposed azimuthally separated sockets in said medial portion of the packing ring, said protuberant means comprising a plurality of annularly disposed azimuthally separated pins on said medial portion of said adjacent compression means extending into said sockets.

10. Packing assembly according to claim 9, said pins and sockets being tapered, converging going axially in the direction from said adjacent compression means to said ring.

11. Packing assembly according to claim 3, said thin portion being formed by a plurality of annularly disposed, azimuthally separated sockets in the upper face of said medial portion of the packing ring, said protuberant means comprising a plurality of annularly disposed azimuthally separated pins extending downwardly from said medial portion of the upper compression means into said sockets.

12. Packing assembly according to claim 11, said packing ring having bevels at its upper inner and outer peripheral edges and said upper compression means having inner and outer peripheral lips correlative to said bevels, said pins and sockets being tapered with blunt tips and bottoms respectively and converging going axially of the assembly in the direction from said adjacent compression means to said ring, whereby upon loading of said assembly the material of the packing ring is forced from said medial portion thereof radially inwardly and outwardly and downwardly into said lips.

13. Rod seal packing assembly comprising a packing ring of resilient material having inner and outer annular peripheral seal portions for sealing with a rod extending therethrough and a box thereabout and an annular medial stress control portion therebetween, said medial portion including a thin part which has a lesser thickness than the thickness of the adjacent part of said ring, and hard ring shaped means above and below said packing ring for compressing said medial portion therebetween and flowing the resilient material of the medial portion into said peripheral portions to energize same for sealing, said hard means being made of material harder than said packing ring resilient material, the uncompressed thickness of said thin part being in the range of 15% to 30% of said adjacent parts of said ring whereby when the thin part has been compressed sufficiently to create a stress therein sufficient to deter further compression of the packing assembly, the peripheral portions of the ring are energized at a stress low enough to prevent too rapid wear thereof.

14. Assembly according to claim 13, said packing ring having annularly disposed concave portions on the upper and lower faces of said medial portion, said hard means having correlative protuberant means thereon to enter said concave portions and grip said thin part therebetween.

15. Rod seal packing assembly resilient compressible packing ring adapted to be disposed between relatively hard, incompressible upper and lower ring shaped compression means respectively above and below said packing ring, said packing ring comprising inner and outer annular peripheral portions including seal means to seal with a rod extending therethrough and a box thereabout, respectively, and an annular medial portion between said peripheral portions connecting them together to form a unitary ring, said medial portion of said packing ring including a thin portion having a thickness of the order of 15 to 30 percent of that of the adjacent portions of the ring.

16. Rod seal packing assembly resilient compressible packing ring according to claim 15, said packing ring being made of material including an elastomer and having a durometer hardness on the Shore A scale in the range of 60 to 95 and being adapted for compression between compression means having a hardness above 100 durometers on the Shore A scale.

17. Rod seal packing assembly resilient compressible packing ring according to claim 15,
said medial portion of the packing ring having concavities in its upper and lower faces adapted to receive correlative convexities on said compression means.

18. Rod seal packing assembly resilient compressible packing ring according to claim 17,
said seal means comprising inner and outer peripheral lips extending downwardly from said inner and outer peripheral portions of said packing ring,
said inner and outer peripheral portions of said packing ring being bevelled on their upper inner and outer edges respectively, to engage with correlative lips on the upper compression means which back up the lips of said seal means.

19. Rod seal packing assembly resilient compressible packing ring according to claim 15,
said thin portion of said medial portion of said packing ring being formed between annular grooves in the upper and lower faces of said packing ring.

20. Rod seal packing assembly resilient compressible packing ring according to claim 15,
said thin portion of said medial portion of said packing ring being formed by blind holes in the upper face of said packing ring.

21. Packing assembly according to claim 3,
said compression means comprising adapter rings,
said assembly including a plurality of such packing rings alternating with such adapter rings such that each adapter ring that is in between two packing rings serves as upper compression means for the packing ring therebelow and as lower compression means for the packing ring thereabove.

* * * * *

UNITED STATES PATENT AND TRADEMARK OFFICE
CERTIFICATE OF CORRECTION

PATENT NO. : 4,169,604
DATED : October 2, 1979
INVENTOR(S) : JOE W. HEATHCOTT

It is certified that error appears in the above-identified patent and that said Letters Patent are hereby corrected as shown below:

```
Column 2, line 55, after "is" insert -- a --.
Column 5, line 13, after "listed" insert -- patents --.
Column 5, line 60, change "flattended" to -- flattened --.
Column 7, line 30, delete "said".
Column 7, line 31, at beginning of line insert -- said --.
Column 7, line 32, indent entire line.
Column 7, line 33, indent entire line.
Column 7, line 47, change "rom" to -- from --.
```

*Signed and Sealed this*

*Twenty-fifth* Day of *March 1980*

[SEAL]

*Attest:*

*Attesting Officer*

SIDNEY A. DIAMOND

*Commissioner of Patents and Trademarks*